United States Patent [19]
Freake et al.

[11] 3,881,993
[45] May 6, 1975

[54] TESTING DEVICE FOR MICROORGANISMS

[75] Inventors: Ronald Freake; Leon Francis Strenkoski; Daniel Glen Aitken, all of Elkhart, Ind.; Billy Harper Haden, Rochester, N.Y.

[73] Assignee: Miles Laboratories, Inc., Elkhart, Ind.

[22] Filed: May 7, 1973

[21] Appl. No.: 357,933

Related U.S. Application Data

[63] Continuation-in-part of Ser. No. 124,671, March 16, 1971, abandoned.

[52] U.S. Cl. ............ 195/139; 195/103.5 R; 195/127
[51] Int. Cl. ............................................. C12k 1/00
[58] Field of Search .................. 195/103.5, 127, 139

[56] References Cited
UNITED STATES PATENTS
2,904,474  9/1959  Förg ................................ 195/139
3,532,603  10/1970  Freake ...................... 195/103.5 R

*Primary Examiner*—A. Louis Monacell
*Assistant Examiner*—Robert J. Warden
*Attorney, Agent, or Firm*—Robert J. Schwindaman

[57] ABSTRACT

An improved test device for assaying a liquid specimen for microorganisms. The device is adapted to be inoculated by immersion in the specimen and to thereafter culture microorganisms therein by incubation in a sealable container. The device generally includes an absorbent matrix impregnated with a nutrient medium containing test reagents and a culture-fixing agent for localizing colony location throughout the culturing period.

12 Claims, 6 Drawing Figures

INVENTORS
RONALD FREAKE
LEON F. STRENKOSKI
DANIEL G. AITKEN
BILLY H. HADEN

BY Robert J. Schwinkman

ATTORNEY

TESTING DEVICE FOR MICROORGANISMS

CROSS-REFERENCE TO RELATED APPLICATIONS

This application is a continuation-in-part of U.S. application Ser. No. 124,671 filed Mar. 16, 1971 now abandoned.

BACKGROUND OF THE INVENTION

Assays of liquid specimens for the presence of microorganisms are commonly performed in medicine, industry and by governmental agencies to determine the degree of microbiological contamination in various sample specimens. In many assays of this type, the presence of microorganisms is frequently of secondary importance, and the concentration of the microorganism in the specimen is the paramount factor to be determined. For example, the diagnosis of bacteriuria is determined by the concentration of microorganisms present in a urine specimen and not by the mere presence of microorganisms therein. Likewise, milk and water samples are considered "contaminated" only when the concentration of microorganisms present therein exceeds a defined maximum standard.

One quantitative method of testing for microorganisms involves preparing serial dilutions of a measured quantity of the sample; inoculating a nutrient agar medium with a measured quantity of a dilution; and incubating the inoculated medium for approximately 24 hours. If the sample is contaminated, individual colonies of the propagated microorganisms can be visually observed and counted. The concentration of microorganisms per milliliter of the sample is then calculated by multiplying the number of microorganisms colonies by the dilution of the sample.

The disadvantages inherent with the foregoing method is the need to prepare serial dilutions of the sample, the need to prepare an agar medium, and the necessity for a considerable quantity of clean and sterilized laboratory equipment.

A second method has been devised in which measured volumes of a sample are filtered through a semipermeable membrane. The concept of the method is to select a membrane having a porosity such that the microorganisms are prevented from passing through the membrane. Subsequent to the filtering step, the membrane is removed from the filter and juxtapositioned on a nutrient agar medium whereby nutrients incorporated therein may diffuse through the membrane. Upon incubation, the microorganisms are propagated on the membrane and are thereafter observed and counted as in the hereinbefore described method.

While the latter method is an improvement in certain respects over the original method, filtering equipment is necessary, and in addition, it is necessary to clean and resterilize the filter equipment. Also, the sample is still necessarily measured prior to filtering, thereby requiring additional time and more equipment.

The testing device of this invention contemplates a bibulous matrix impregnated with a nutrient medium containing test reagents, and a culture-fixing agent. In use, the impregnated matrix is dipped momentarily into or otherwise saturated with the liquid to inoculate the matrix which absorbs a known volume of sample.

The inoculated device is incubated for a period of from about 4 to 24 hours. Any microorganisms present therein are propagated to form distinct colony locations, each location being indicative of a microorganism. The locations are readily apparent as a result of the reagent and are easily counted. The number of colony locations apparent on the matrix readily determine the concentration of microorganisms in the test specimen.

THE PRIOR ART

One test device is presently known that teaches a method to inoculate a nutrient impregnated matrix by direct immersion thereof in the sample to be analyzed. This device is described in U.S. Pat. No. 2,904,474 and generally includes a paper strip impregnated with a nutrient medium containing a test substance, the strip having a separable handle, and a sheath to enclose the strip for incubating purposes.

The absence of a culture-fixing agent in the foregoing device presents the disadvantage that motile microorganisms fail to localize and thereby fail to form distinct colonies or locations necessary for counting them for semi-quantitative testing purposes.

The provision of a fixing agent in the test device of this invention enables the cultured microorganisms then to form distinct colony locations capable of being counted so necessary in a reliable quantitative test.

SUMMARY OF THE INVENTION

A device for analyzing a sample for microorganisms adapted to be inoculated by immersion into a liquid sample and incubated in a sealable container, the device comprising a bibulous matrix, preferably filter paper, impregnated with a conventional nutrient medium, suitable reagents and a culture-fixing agent to enable localization of colony formations in the matrix. A holder and container may be provided to form an integral test device.

DESCRIPTION OF THE PREFERRED EMBODIMENT

Figure 1:
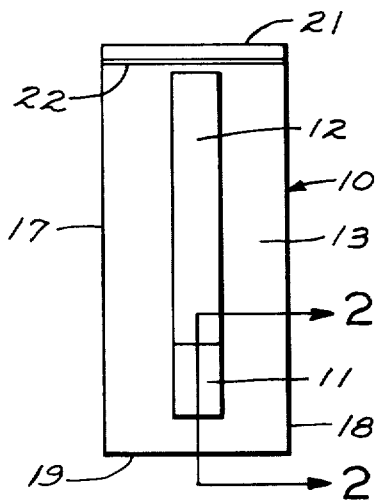
FIG. 1 is an elevational view of a test device of this invention enclosed within a container.

Referring to the drawings, and particularly to FIG. 1, the test device of this invention is indicated generally by the numeral 10. The test device 10 generally includes an absorbent matrix 11 attached to a holder 12 enclosable within a sealable container 13.

The matrix 11 is formed from a flat bibulous material such as absorbent filter paper, or the like, impregnated with a suitable nutrient medium, a reagent, and a culture-fixing agent. The matrix 11 is adapted to be inoculated by dipping it into the sample specimen to be assayed and absorbing a portion thereof, thereby obviating the hereinbefore described necessity to measure and/or dilute the sample. It is necessary for the matrix 11 to have a known constant absorption capacity for purposes of semi-quantitative determinations. Thus, if the matrix 11 is known to absorb a known volume of the sample, i.e., 0.2 ml., the concentration of microorganisms in the sample can be easily determined, as hereinafter described.

It should be understood that upon rehydrating the bibulous matrix 11 in a liquid sample, a specific volume of the sample is absorbed by the matrix 11 and any microorganisms present in the absorbed sample are likewise absorbed by the matrix 11. In this manner the matrix 11 is inoculated. When the inoculated matrix 11, impregnated with a suitable nutrient medium, is incubated, the microorganisms are cultured and form colonies.

Thus, for the purpose of this disclosure, the term "microorganism" refers to the general class of microorganism comprising yeast, other fungi or bacteria, present in the sample to be analyzed. The term "colony" refers to the "microorganism" subsequent to culturing. The term "colony location" indicates the site of a colony as observed on the matrix 11 and is synonymous, for the purpose of this disclosure, with the term colony.

The nutrient medium may be any conventional medium, or modification thereof, known to provide a suitable environment for the selected test. For semi-quantitative testing, a general nutrient medium such as Bacto Brain Heart Infusion, commercially available from Difco Laboratories, Detroit, Mich. is preferred. This type of medium is considered a general medium and is capable of culturing most microorganisms.

The reagent preferably includes an indicator capable of providing a color change in the matrix 11 in response to a positive culturing of microorganisms. The reagent may be included in the nutrient medium and may comprise a simple pH indicator such as phenol red or the reagent may include a reduction-oxidation type indicator such as one of the various tetrazolium compounds, i.e, 2,3,5-triphenyltetrazolium chloride (colorless), which compound is reduced to a formazan, i.e. triphenyltetraformazan (intense red), by most microorganisms during their growth. In preparing the matrix 11 for a semi-quantitative test, triphenyltetrazolium as an indicator is preferred, since the reduced product, triphenyltetraformazan not only provides a bright visible color, it also has the characteristic of being insoluble. The insoluble property, combined with the hereinafter described culture-fixing agent, facilitates, the formation of separate and distinct colony locations.

The addition of a culture-fixing agent to the impregnation formulation is necessary to localize motile microorganisms in the matrix 11 subsequent to inoculation. The ability of the culture-fixing agent to localize the microorganisms and thereby enable the formation of separate and distinct colonies in and on the matrix 11 is particularly important to enable the cultured colonies to be counted for purposes of performing meaningful semi-quantitative tests. The fixing agent is used in the impregnated formulation in concentrations ranging from about 0.1 to about 5.0 percent by weight, with a range of about 0.5 to about 3.0 percent by weight preferred.

The fixing agent is characterized as being soluble in an agueous solution to form a viscous colloidal suspension. Fixing agents found to be suitable, either alone or in combination for this purpose are inert gums, such as carrageens and various linear polysaccharides.

Once the matrix 11 is impregnated, it is then dried. Since a high temperature may effect some of the nutrient and test materials impregnated into the matrix 11, it has been found that drying the impregnated matrix 11 in a vacuum or a forced air oven at about 40°–60°C. for 1 to 3 hours is preferred.

Figure 2:
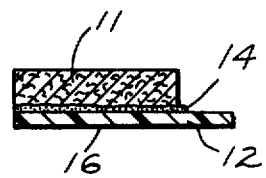
FIG. 2 is an enlarged fragmentary sectional view of the device of FIG. 1 removed from the container, said view being taken along the line 2 — 2 of FIG. 1.

To provide a convenient integral test device 10, the dried impregnated matrix 11 is attached to a holder or handle 12. The holder 12 is an elongated member preferably formed of a stiff, insoluble material, such as a strip of polyethylene terephthalate, or the like. Since the matrix 11 is to be adapted for microbiological purposes, special care must be taken to secure the matrix 11 to the holder 12 with a microbiologically inert adhesive. Certain double-faced tapes, such as No. 415 and No. 419 commercially available from 3M Company, Minneapolis, Minn., have been found suitable for this purpose. The matrix 11 may also be readily attached to the holder 12 by bonding without affecting the matrix 11, the impregnated medium or the reagent. To facilitate this, a thin polyethylene sheet 14 (FIG. 2) is disposed between the holder 12 and matrix 11, and sufficient heat is applied to the side 16 of the holder 12 distal to the matrix 11 to cause the strip to melt and bond the matrix 11 to the holder 12.

The matrix 11 (FIG. 1) and attached holder 12 are then placed in the sealable container 13, sterilized, and the container 13 is sealed. Generally, any conventional container 13 capable of being resealed has been found suitable for this purpose. It has been found that an envelope of polyethylene, or the like, which is sealed along its sides 17 and 18 and bottom 19 is acceptable for this purpose. The top 21 of the container 13 or envelope is preferably provided with a conventional interlocking seal lip 22 which frictionally seals the container 13 upon the application of pressure thereon and thus obviates the necessity for special sealing instruments. Preferably, the container 13 is formed of a clear transparent material which enables the operator to visually observe and "read" the matrix 11 within the container 13 without exposing either the operator or laboratory to the cultured microorganisms.

In use, the container 13 is unsealed and the sterile holder 12 and attached matrix 11 are removed therefrom. The matrix 11 is dipped into the liquid sample to be tested, such as urine, milk, water, or the like, to rehydrate and inoculate the matrix 11. The inoculated matrix 11 and attached holder 12 are aseptically replaced in the container 13, and the container 13 is resealed and incubated at the optimum temperature, depending upon the suspected microorganisms, for at least 4 hours. Most microorganisms are optimumly incubated at temperatures ranging from about 4° to about 40°C., and preferably from about 35° to about 39°C. Following the incubation period, the matrix 11 is visually observed and the results of the particular test are read. The number of colored spots, indicating colony locations, are counted and recorded, as hereinafter described. Once the results of the test are known, the device 10 may be sterilized and discarded. It has been found however, that sterilization does not effect most color changes formed in the matrix 11 as a result of the culturing of the microorganisms, and the device 10, or merely the matrix 11, may be retained as a permanent record if desired.

In microbiological populations, cell numbers are often of such magnitude that it is difficult to express them easily or exactly. To simplify the handling of these large numbers, the microbiologist uses exponents of 10. For example, a concentration of microorganisms per milliliter of specimen expressed $10^2$ is equivalent to 100 microorganisms per milliliter, $10^3$ to 1,000 and $10^4$ to 10,000 and so on. Thus, the exponent of 10 represents the number of zeros to the right of the digit 1. Since only the relative concentration of microorganisms in a sample is sufficient for microbiological purposes, this manner of expressing the number of microorganisms per milliliter is not only adequate, but expedient.

Figure 3:
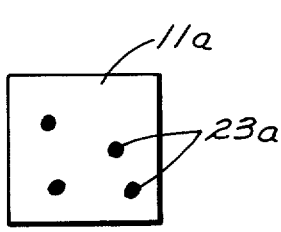
FIGS. 3, 4, 5 and 6 are plan views of device matrices showing colony locations in conjunction therewith.
Figure 4:
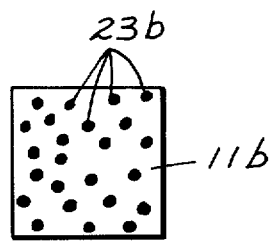
Figure 5:
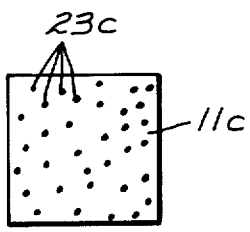
Figure 6:
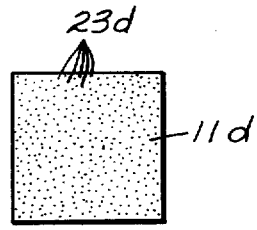

Relating the above explanation to the present invention, the significance of the culture-fixing agent can be best illustrated in FIGS. 3–6. With reference to FIG. 3, the appearance of 4 locations 23a can be observed. This number would be indicative of 20 microorganisms per milliliter or a concentration expressed as $10^1$. The locations 23b appearing on FIG. 4 would indicate a concentration of $10^2$. The locations 23c and 23d on FIGS. 5 and 6, while clear and distinct, become too numerous to easily count and can best be interpreted by comparing same to a standard or chart showing the approximate number of locations that would appear on a corresponding matrix 11, and assigning concentrations of $10^3$ and $10^4$ to the FIGS. 5 and 6 respectively. Concentrations of samples exceeding $10^6$ microorganisms per milliliter create such a multiplicity of colony locations thereon, the matrices take on a substantially solid color thereby portraying a confluent appearance.

The following examples will illustrate the improved test device of this invention.

EXAMPLE I

A Test Device 20.0 Grams of sodium alginate, a fixing agent, were added to 1 liter of distilled water and agitated until dissolved. To this solution, the following formulation was added.

| | |
|---|---|
| Calf Brain, infusion | 220 grams |
| Beef Heart, infusion | 275 grams |
| Proteose Peptone | 11 grams |
| Dextrose | 2.2 grams |
| Sodium Chloride | 5.5 grams |
| Disodium Phosphate | 2.75 grams |
| Triphenyltetrazolium Chloride | .165 grams |
| Polysorbate 80 | 0.1 ml. (.01%) |

The ingredients were mixed thoroughly until dissolved in the alginate solution to provide a final pH of 7.4.

Sheets of Schliecher and Schuell No. 470 filter paper were immersed in the above solution until thoroughly saturated and drawn between two closely fitted glass rods to remove excess solution therefrom and to insure uniformity of impregnation. The sheets were then dried in a forced air oven at about 55°C. for 2 hours. The dehydrated sheets were then cut into pads measuring 1 × 2 centimeters, which size pad had been found to absorb 0.2 ml. of liquid specimen.

Holders for the pads were prepared by cutting sheets of polyethylene terephthalate into strips measuring approximately 1 × 6 centimeters. To attach the pads to the holders, the pads were placed on a cushioned table and a thin sheet of polyethylene was placed over each pad. The strips were then placed over the polyethylene sheets such that each pad was disposed adjacent one end of each strip. A hot plate, heated to approximately 280°F, was placed on top of the strips for about 5 seconds to melt the polyethylene sheets and bond the pad to the strips. The holders and attached pads were then placed in sealable transparent containers and sterilized with ethylene oxide.

EXAMPLE II

Semi-Quantitative Tests a. Preparing Test Samples

Test samples were prepared by propagating cultures of *Escherichia coli*, *Proteus mirabilis*, *Enterobacter aerogenes*, *Pseudomonas aeruginosa*, *Staphylococcus aureus*, and *Streptococcus faecalis* in brain heart infusion broths to maximum turbidity ($1-5 \times 10^9$ cells per milliliter). Tenfold serial dilutions of each culture were prepared using saline as a diluent to provide serial bacterial suspensions of each culture ranging from $10^1$ thru $10^7$ cells per milliliter.

b. Testing the Samples

To test each of the above test sample dilutions, a test device as described in Example I was employed. The container was unsealed and the holder and pad removed therefrom. The sterile, dehydrated matrix was dipped momentarily into one of the sample dilutions to inoculate and rehydrate the matrix or pad. The inoculated pad, together with the holder, was again placed in the container. The container was sealed to prevent dehydration of the pad and placed in an incubation chamber maintained at 37°C. for a period of about 12 hours. A conventional plate count was performed on each of the specimen dilutions to verify the cell concentrations contained therein and to serve as a control by which the results observed on the test device could be compared.

Subsequent to the incubation period, the devices were withdrawn from the incubator and the matrices were observed through the transparent containers. The reduction of the colorless triphenyltetrazolium to the magenta colored triphenyltetraformazan was visible in all of the incubated pads. In those pads which were inoculated with samples having a cell concentration of less than $10^5$ cells per milliliter, distinct and definite magenta colored spots, each spot indicative of a colony location were observed. The number of spots were observed to increase as the known concentration of the sample increased. A confluent magenta color was noted on all pads inoculated with a sample having a concentration of $10^6$ cells per milliliter or higher.

In comparing the number of spots appearing on the pads to the cell concentrations in the test samples, a definite and distinct relationship was found to be present. It was observed that the number of spots increased in accordance with the concentration of microorganisms in the test samples.

When the tests were repeated using clinical urine specimens, fresh pasteurized Grade A milk samples and a spoiled milk sample, substantially the same results were obtained. The colony locations on the pads corresponded to the results obtained by a pour agar plate count control.

When other culture-fixing agents such as various alginates, inert polysaccharide gums, linear polysaccharides, and low concentrations of agar were substituted for sodium alginate in the formulation of Example I, substantially the same results were observed in that the propagated colonies were localized and a semi-quantitative determination was obtained.

When the tests were repeated using a device prepared in accordance with Example I, only absent a fixing agent, the pads were observed to be confluent pink or magenta color at all concentrations following incubation.

The same test was repeated using prior art Forg devices commercially available from Bacto-Strip AG of Zurich, Switzerland. Substantially the same results were observed with the Forg device as with the device prepared without a culture-fixing agent.

The tests of this example verified that a reliable semi-quantitative assay is impossible in the absence of a culture-fixing agent to localize motile microorganisms for counting purposes.

While the above disclosure and examples have been directed primarily to a test device having a matrix attached to a holder and enclosed within a container, it should be recognized that the invention also contemplates the production of only the impregnated matrix. For example, conventional laboratory equipment, such as forceps and slide mailers, may be used to replace the holder 12 and container 13, respectively. The sterile dehydrated matrix could be held by the forceps and dipped into the samples to be analyzed and subsequently placed in a slide mailer and incubated. Also, the impregnated matrix 11 may be rehydrated and inoculated, if desired, by adding a measured volume of the sample directly to the matrix 11, rather than by the immersion procedure hereinbefore described.

In addition, it will be apparent to those skilled in the art that the device is adaptable for detecting the presence of microorganisms in samples other than liquids. For use in this manner, the matrix 11 may be rehydrated with sterile water, or the like, and inoculated by contact with the "solid" sample to be analyzed.

It is also understood that the present invention is not limited to the specific bibulous materials, nutrient media, reagents, or fixing agents described in the above examples, as one skilled in the art will recognize that a wide variety or combination of bibulous materials, nutrient media, reagents and fixing agents can be employed to carry out the purpose of the novel test device.

In summary, the present invention relates to a test device adapted to assay a specimen for microorganisms, the device having an absorbent matrix impregnated with a nutrient medium including a reagent and a culture-fixing agent. The test device is adapted to be inoculated by dipping same into a test specimen and to culture the microorganisms absorbed on the matrix upon incubation. The novel test device can selectively provide a relatively quick semi-quantitative microbiological assay of a specimen following a simple and economical procedure.

What is claimed is:

1. A test device for analyzing a sample for microorganisms, said device being adapted to be inoculated with the sample and incubated in a sealable container, the device comprising:
    an absorbent matrix impregnated with a nutrient medium, a reagent, and a water soluble culture-fixing agent capable of forming a viscous suspension in an aqueous solution to localize the microorganisms on said matrix.

2. A test device as defined in claim 1 wherein said matrix includes a flat bibulous material.

3. A test device as defined in claim 2 wherein said bibulous material has a known constant absorption capacity.

4. A test device as defined in claim 1 wherein said reagent includes a color indicator.

5. A test device as defined in claim 4 wherein said indicator is triphenyltetrazolium chloride.

6. A test device as defined in claim 1 wherein said culture-fixing agent is an inert gum.

7. A test device as defined in claim 1 wherein said culture-fixing agent is a linear polysaccharide.

8. A test device as defined in claim 1 wherein said culture-fixing agent is sodium alginate.

9. A test device for analyzing a sample for microorganisms, the device comprising;
    an absorbent matrix impregnated with a nutrient medium, a reagent and a culture-fixing agent capable of forming a viscous suspension in an aqueous solution to localize the microorganisms on said matrix;
    a holder attached to said matrix; and
    a sealable container enclosing said matrix and holder.

10. A test device as defined in claim 9 wherein said holder includes a stiff elongated member.

11. A test device as defined in claim 10 wherein said container is transparent.

12. A test device as defined in claim 10 wherein said container includes an interlocking seal lip.

* * * * *